Dec. 7, 1965   H. R. SCIVALLY ETAL   3,222,140
MEANS AND APPARATUS FOR CATALYTICALLY OXIDIZING
AN EXHAUST GAS STREAM
Filed Oct. 29, 1962   2 Sheets-Sheet 1
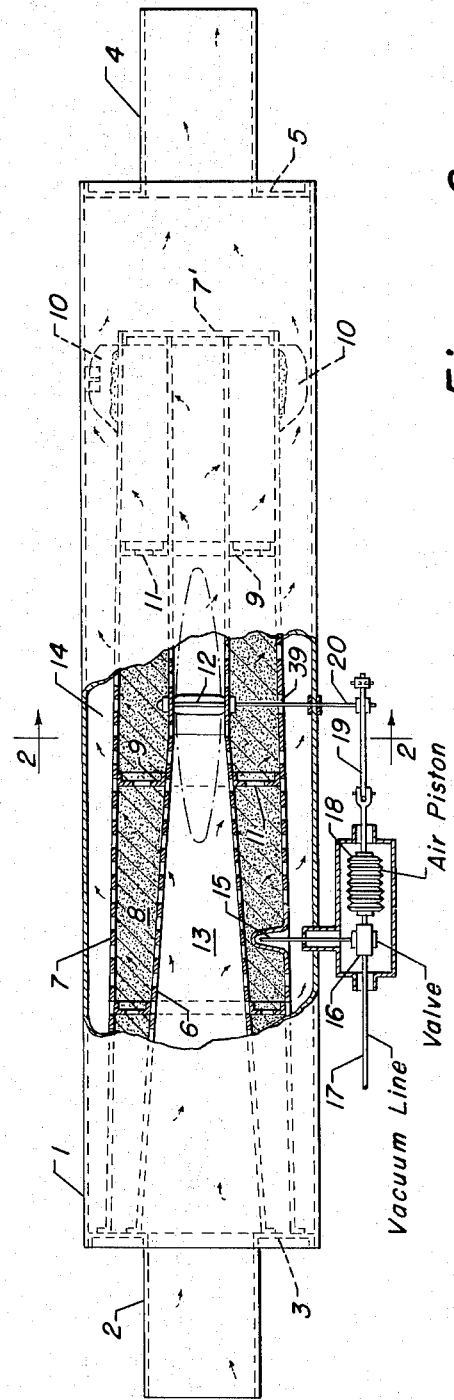
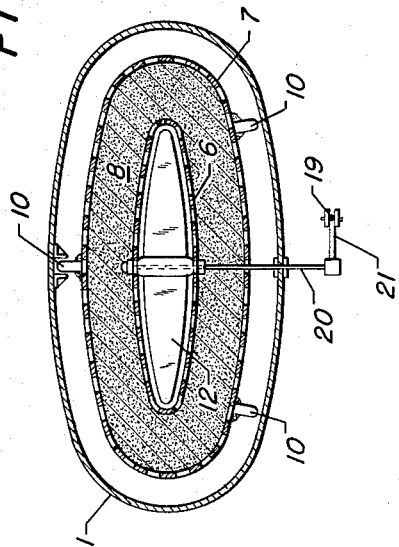
INVENTORS:
H. Robert Scivally
Fletcher Thorne-Thomsen
BY:
James R. Hoatson Jr.
Philip S. Liggett
ATTORNEYS

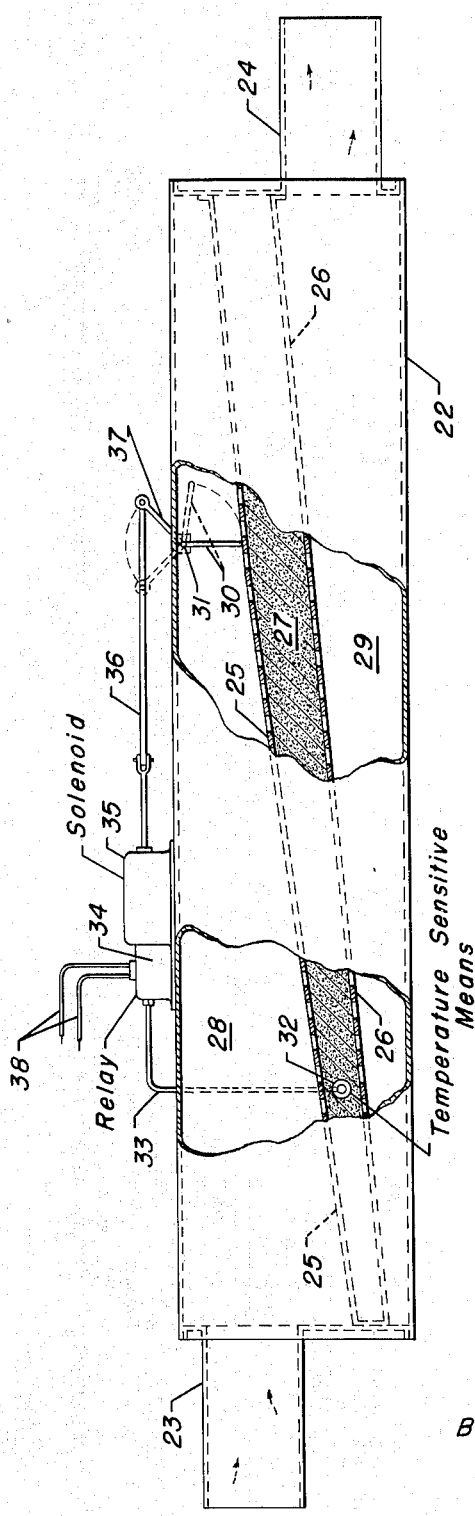

3,222,140
MEANS AND APPARATUS FOR CATALYTICALLY
OXIDIZING AN EXHAUST GAS STREAM
Herschell Robert Scivally, La Canada, Calif., and Fletcher
Thorne-Thomsen, Shreveport, La., assignors to Universal Oil Products Company, Des Plaines, Ill., a corporation of Delaware
Filed Oct. 29, 1962, Ser. No. 233,688
4 Claims. (Cl. 23—288)

The present invention relates to improved means and apparatus for carrying out the catalytic oxidation of an exhaust gas stream in order to provide an active ignition zone and an extended life for a portion of the catalyst bed. The improved flow arrangement and apparatus design utilizes valving means in the flow path of the exhaust gas stream to limit the exposure of a part of the catalyst bed after the entire bed reaches a predetermined temperature level. Actually, a portion of the catalyst bed is permitted to have only low temperature exposure for relatively short periods of operating time such that there will be a minimum of any undesirable high temperature operation as well as lead deposition on such portion of the bed and a resulting lengthened life to its low temperature ignition performance.

The desirability of removing or converting the noxious compounds of vehicular exhaust gases has been generally well established as a means for overcoming smog in many geographical areas. In a catalytic operation, the hot gases issuing from the motor exhaust manifold are mixed with a quantity of secondary or combustion air and the resulting mixture passed through a catalyst bed maintained within a conversion zone so as to effect a more or less complete oxidation of carbon monoxide and unburned hydrocarbons present in the exhaust stream. The use of a catalytic method and apparatus also provides for the initiation of the oxidation reaction at lower temperatures than might otherwise be possible and effectively eliminates the need for igniting means which are generally used with most types of "afterburners" or other apparatus which depend strictly upon thermal conditions.

A preferred form of exhaust gas conversion apparatus embodies a design and construction which provides for the internal placement or positioning of a catalyst bed such that it may be utilized in an efficient manner and to maximum degree. It is not intended to limit the present invention to the use of any one type of catalyst since there are improved catalyst compositions available which will retain their catalytic efficiency for long periods of operation. The catalyst is used in particle form, such as small spheres, cylinders and/or pellets, and is disposed in a suitable catalyst retaining section providing for uniform flow therethrough.

The effects of high temperature operations and of lead deposition on a catalyst are not fully known or predictable at the present time, however, in connection with catalytic converters it does appear that high temperature operations above the 1450° F. range does have an adverse effect on low temperature ignition ability of the catalyst and hydrocarbon conversion efficiency. Lead deposition from so called "leaded" gasoline also appears to effect the low ignition characteristics of the catalytic material as well as limit the life of the material.

It is, therefore, a principal object of the present invention to provide means for eliminating a portion of the conversion bed from sustained use after a startup period of the auto engine so as to preclude high temperature operation through such portion of the catalyst bed and achieve a resulting longer active life therefor.

It is also an object of the present invention to arrange the catalyst bed with respect to the exhaust gas stream or inlet manifold such that there is a more or less parallel or non-perpendicular flow of the gas stream through the catalyst bed and damper means associated with the inlet manifold to permit the periodic elimination of exhaust gas flow through at least a portion of the total bed.

A still further object of the invention is to provide automatically operating means associated with the damper means which preclude continuous flow to a portion of the catalyst bed, i.e., such that flow is blocked or unblocked with respect to such portion of the bed responsive to variations from a predetermined temperature level as noted in an upstream portion of the bed.

Various apparatus designs and embodiments may be provided for catalytic converter-mufflers permitting the exhaust gas stream to flow through a relatively thin bed of subdivided solid particles without effecting an unduly large pressure drop in the system. However, most of the preferred forms of apparatus and flow patterns through a given unit effect a gas flow or inlet manifold arrangement which does not introduce exhaust gas stream directly perpendicular to a flat bed of catalyst to cause a major portion of the stream to pass through the center portion of the bed, with a minimum of flow through the peripheral areas. In other words, the utilization of a radial inward or outward flow through an annular form of catalyst bed or, alternatively, flow through a sloping elongated rectangular form of catalyst bed tends to permit better gas distribution and more uniform flow patterns through the entire bed. It has been noted, however, in connection with an annular form of catalyst bed or sloping rectangular bed there is a tendency for the portion of the catalyst bed which is in the downstream end of the direct flow path of gases to provide a zone of initial catalytic ignition of the combustible gases in the exhaust gas stream. Actually, the velocity head effect of the incoming gas stream to the unit tends to impinge the highest pressure and greatest quantity of the flow stream at the downstream end of the flow path so that ignition takes place at such downstream end and has a gradual backward movement of a burning wave through the catlyst bed. Various provisions may be made to increase the pressure drop through the downstream end of the catalyst bed and equalize flow through the entire inlet area of the catalyst section. However, there is still a tendency for the ignition to take place at the downstream end of the catalyst bed with respect to the path of the incoming flow stream and a slower ignition and temperature buildup within the upstream portions of the bed. Thus, in an automatic apparatus arrangement of the present invention it is generally desirable to provide a temperature reading means or temperature sensitive means at the upstream end of a bed so as to insure sustained catalytic oxidation in such portion prior to cutting out gas flow through the downstream end portion which will remain out of active service until such time as there is another startup of the engine, or a period of low temperature operation which would necessitate bringing into use the entire bed, including the active portion thereof.

In one embodiment, the present invention provides a method for catalytically treating an exhaust gas stream containing oxidizable gaseous compounds in a manner which comprises passing such stream in admixture with air through a catalytic oxidizing zone containing a bed of particulated oxidizing catalyst and therein initiating the burning of the oxidizable compounds from such stream, continuing the flow of the gas stream through the entire oxidizing zone until the temperature of the catalyst bed exceeds a predetermined level, then blocking the gas flow through at least a portion of said oxidizing zone whereby the catalyst therein is subjected to only initial low temperature contact with the exhaust gas stream and the flow of said exhaust gas stream is alternately unblocked from said portion to provide flow to the entire oxidizing zone and blocked from passage to the portion thereof responsive to the temperature in said bed varying from said predetermined level.

In a preferred flow pattern a catalyst bed is maintained within a generally sloping relationship, or at an acute angle, with respect to the incoming flow path of the exhaust gas steam and provision is preferably made to eliminate flow to the downstream end portion of the bed after the entire bed or upstream end portion thereof reaches a predetermined temperature level which will sustain catalytic oxidation. For example, the downstream end portion of the bed may be blocked out of operation by a suitable flow diverting means after the upstream end portion of the catalyst bed reaches the order of 800° F. This insures that the downstream end portion never operates at a temperature above the approximately 800° F. range and in addition is exposed to lead containing gases, from leaded fuel, only during a short startup period which may be substantially less than ten percent of the operating time of the entire converter unit. This minimum exposure continues the low temperature ignition performance or characteristics of the catalyst in the converter bed and insures better low temperature cold starting for the converter-muffler unit.

In another embodiment, the present invention provides a catalytic converter-muffler unit for treating exhaust gas stream and comprises in combination, an elongated outer housing having an inlet port at one end and an outlet port at the other end thereof, an elongated perforate catalyst retaining section extending for at least a major portion of the interior length of said housing, subdivided catalyst particles maintained within said catalyst retaining section, an inlet manifold means from the inlet port at one end of said housing that is coextensive with one face of said perforate catalyst retaining section and suitable for distributing a gas stream therethrough, an opposing gas collection manifold coextensive with the opposing face of said catalyst retaining section and connective with the outlet port of said housing, whereby an exhaust gas stream may be passed through said housing and through the catalyst maintained therein, and movable damper means positioned across said gas inlet manifold, with said damper means adjustable to preclude gas flow through a downstream end portion of said inlet manifold and through said catalyst retaining section opposing such downstream end thereof.

In a preferred apparatus embodiment, a temperature sensititve means is made connective with said catalyst retaining section opposing the unblocked portion of said inlet manifold section, and motor means is connected with both said temperature sensitive means and with said movable damper means whereby the latter may be adjusted by said motor means responsive to said temperature sensitive means and effect the closing and opening of the downstream end portion of said inlet manifold section responsive to variations in temperature level indicated by said temperature sensitive means.

In view of the advantages of a radial flow through a treating bed of subdivided particles, one preferred form of converter unit embodies a cylindrical or oval-form of housing encompassing an annular-form bed for treating an exhaust gas stream in an arrangement which comprises in combination an elongated outer cylindrical-form housing having a gas port at each end thereof, an inner perforate tubular-form gas conducting member extending from one of said gas ports for a major portion of the interior length of said housing to a non-perforate end closure plate spaced from the opposing gas port, an outer perforate tubular-form particle retaining member positioned around said inner perforate member and coextensive therewith from the end of said housing to said end closure plate, said outer perforate member being spaced from said inner member and from the inside wall of said housing and forming thereby a confined annular-form particle retaining section between the perforate members and an open-ended elongated annular-form gas manifold section which surrounds said particle retaining section and is in open communication with the space between said end closure plate and said opposing port, subdivided exhaust gas treating particles within said particle retaining section, a movable damper member mounted within the interior of said inner perforate tubular member at a spaced distance from said end closure plate and adjustably movable to block and unblock gas flow longitudinally through a portion of said inner perforate member, temperature sensitive means in said bed connective with motor means, said motor means in turn connecting with said movable damper member, whereby the latter may be moved to alternatively obstruct and permit exhaust gas flow through a downstream end of said inner tubular member responsive to a variation in temperature from a predetermined level as measured by said temperature sensitive means.

As noted hereinbefore, a preferred form of apparatus also utilizes an automatically operating valve or damper means to block and unblock gas flow through a portion of the catalyst bed responsive to the temperature level in an upstream section thereof. For example, a bi-metallic strip or thermo-couple, or other temperature sensitive means, is connective with the particle bed as well as with suitable "motor" means to in turn effect the movement of the valve or damper to preclude the gas flow through the portion of the bed which is to be used only for initial low temperature conditions. The "motor" means may comprise vacuum or electrical power through, respectively, bellows or solenoid means which in turn may connect through suitable linkage to the movable or rotatable damper means.

The present invention may more clearly be set forth and explained in connection with the accompanying diagrammatic drawing which indicates apparatus embodiments for carrying out the improved processing flow arrangement to provide an extended catalyst ignition life to a portion of the bed.

FIGURE 1 of the drawing is a sectional elevational view through a cylindrical or oval-form converter-muffler unit having movable damper means to preclude flow through a downstream end portion of the treating bed.

FIGURE 2 of the drawing is a cross sectional view through the embodiment of FIGURE 1, as indicated by line 2—2.

FIGURE 3 of the drawing indicates diagrammatically, in a sectional elevational view, a converter-muffler of elongated rectangular form also having automatically operated movable damper means to preclude exhaust gas flow through a downstream end portion of the bed.

Referring now specifically to FIGURES 1 and 2 of the drawing, there is shown an outer oval-form housing 1 having an inlet port 2 in an end plate 3 and an outlet port 4 in an end plate 5 suitable for accommodating the passage of an exhaust gas stream. Extending axially inwardly from the end plate 3 and the gas inlet port 2 is an inner perforate tubular member 6 which is adapted to receive and distribute the incoming exhaust gas stream to the converter. The inner tubular member 6 extends for a major portion of the length of the interior of housing 1 terminating at a non-perforate plate 7' which is spaced from end plate 5 of the housing and the outlet port 4. Circumscribing the inner tubular member 6 and spaced therefrom, as well as from the inside wall of housing 1, is an outer perforate tubular member 7. The outer perforate member 7 also extends from end plate 3 to the periphery of non-perforate end plate 7', thus being coextensive with the inner tubular member 6 to form with the latter a catalyst retaining section 8 adapted to hold subdivided particles of an oxidation catalyst suitable for treating the exhaust gas stream.

In order to provide rigidity for the elongated perforate tubular members and for the catalyst section 8 as a whole, there are provided spaced stiffening ribs or diaphragm members 9 between the inner and outer perforate members. Members 9 are preferably provided with openings which will readily permit the passage of catalyst particles through the entire catalyst retaining section 8 as well as readily permit the conduction of heat in the catalyst bed from one end of the section to the other.

The present embodiment also indicates the use of suitable spacer ribs 10 between the outer wall of the outer perforate member 7 and the inside wall of the outer housing 1. Such ribs provide for the proper centering and positioning of the downstream end of the catalyst retaining members 6 and 7, and, more importantly, permit the longitudinal expansion of the entire internal catalyst retaining section from the one end of the outer housing. In other words, the spacer ribs 10 are not connected to the inside wall of housing 1 but are merely in sliding contact therewith such that there may be longitudinal back and forth movement along the inside of the wall of housing 1 as the interior perforate tubular members forming the catalyst section are subjected to heating and cooling under various operating conditions.

In accordance with the present invention, provision is made through the use of a movable oval-shaped damper plate 12 to block flow through a portion of the catalyst bed, and in the particular embodiment from the downstream end portion of such bed. With the incoming exhaust gas stream flow substantially parallel with and axially through the inner tubular member 6, there is generally provided an initial oxidation or ignition of combustibles in the downstream end portion of the catalyst in section 8, with a resulting burning wave traveling gradually upstream until the entire catalyst bed is causing catalytic oxidation of the combustibles in the exhaust gas stream as the latter passes radially from the inner manifold section 13 to an outer manifold section 14. Thus, provision is made to turn the damper 12 transversely across the interior of perforate member 6 and block the downstream end of the inlet manifold 13 so as to preclude flow through the downstream end of the bed after the entire bed has reached a self-substaining catalytic oxidation temperature.

The present diagrammatic drawing indicates a temperature sensitive bi-metallic element 15 connecting with a valve member 16 which in turn regulates the flow of air, or the vacuum through line 17 to an air piston or bellows member 18. The latter connects through a linkage member 19 with the offset end of a rotating pin 20 that in turn connects with the center of damper plate 12. As best shown in FIGURE 2 of the drawing, the linkage rod 19 connects in an off-center manner with the arm 21 from a rotatable pin member 20 such that the damper plate 12 may be rotated through 90° responsive to the action of the air piston 18 and the temperature sensitive means 15.

When the converter-muffler is cold and placed in operation, the damper plate 12 is positioned in a plane parallel with the axis of the inner perforate member 6 and the inner inlet manifold 13 such that the incoming exhaust gas stream will flow freely to the downstream end of the manifold and of catalyst section 8 and radially outward through the entire annular-form catalyst bed in section 8. The treated gas stream is collected in the outer manifold section 14 and then flows longitudinally from the end of the housing 1 by way of outlet port 4. In the normal operation, where the exhaust gas stream flows longitudinally through a tubular manifold section such as 13 to provide a resulting outwardly radial flow, there is a velocity head effect which tends to cause ignition of the combustibles in the gas stream at the downstream end portion of the annulus and a burning wave which moves backwardly countercurrently to the stream flow until the entire catalyst bed is causing catalytic oxidation of the combustibles in the exhaust gas stream at a temperature which is self-sustaining. The temperature level in the entire bed may increase upwardly from ignition temperature levels of perhaps 350°–500° F. to a high temperature level of the order of 1600° F. or so depending, upon the operation of the engine supplying the exhaust gas stream to the unit. A fresh catalytic material, with a minimum of lead deposition or other contamination will have a relatively low ignition temperature, perhaps below 400° F., while with a used, partially leaded, catalytic material having a loss in surface area, there will be a hindering of its ignition ability such that the ignition temperature of the catalyst will necessarily be rather high, say well above about 1000° F. Thus, as hereinbefore set forth, it is desirable to have a flow arrangement which precludes the exhaust gas flow constantly contacting at least a portion of the catalytic material in the bed, whereby it may serve for only initial short periods of operation, i.e., as an ignition catalyst section only.

As the damper plate is positioned transversely across the inner perforate tubular member 6, the gas stream is precluded from entering the downstream section of the catalyst bed and will necessarily be diverted to pass radially outwardly through the entire front or upstream portions of the bed. The present diagrammatic drawing indicates the position of the damper plate approximately two-thirds of the distance downstream within the inner tubular member 6 such that approximately one-third of the catalyst bed is never operated at a high temperature condition and is minimized in its exposure to lead from the exhaust of leaded engine fuels. It is not intended however to limit the present invention to a particular location of the damper means, as long as at least a sufficient portion of the bed is reserved to operate as an initial ignition section and is precluded from the constant gas flow.

In the automatic arrangement, the bi-metallic temperature sensitive means 15 may be provided to operate the valve 16 at a predetermined temperature level, say of the order of 800° F. such that after the upstream end portion of the catalyst section reaches this temperature level there will be an opening of the valve 16 and the operation of the air piston 18 and rotatable pivot member 20 so that the damper 12 will move 90° to effect the blocking of the downstream manifold section 13. The temperature sensing means and the valve means 16 which effect the operation of the damper should, of course, be preadjusted or preset to a level compatible with the particular catalytic material being used in the catalyst section of the converter such that the downstream end is not blocked until such time as the entire bed reaches a temperature level which will maintain catalytic oxidation of combustibles in the exhaust gas stream and until such time as the engine is shutdown or operated at extremely low exhaust gas emission rate. However, the automatic temperature sensitive means in combination with the motor adjustment means will permit automatically unblocking the gas flow and permitting use of the catalyst bed even during low temperature operations where the level falls below a preset amount.

Referring now to FIGURE 3 of the drawing, there is indicated a different embodiment of a converter-muffler apparatus with an elongated rectangular form oxidizing catalyst bed adapted to treat an exhaust gas stream. The outer housing 22 is of an elongated rectangular form with an inlet port 23 at one end thereof and an outlet port 24 at the opposing end thereof. Sloping diagonally across the interior portion of the housing 22 there are spaced perforate plates 25 and 26 which in turn provide an enclosed catalyst retaining section 27 for holding particulated oxidizing catalyst material. The gas flow in the present arrangement enters the inlet port 23 and is distributed by a tapering manifold section 28 across the surface of the catalyst section 27 and through the particles therein to be collected in an outlet manifold 29 and ultimately discharged through port 24.

In a manner similar to the embodiment of FIGURE 1, provision is made to block the exhaust gas flow for high temperature operations at the downstream end portion of the catalyst retaining section 27. Thus, a movable damper plate 30 attached to a rotatable or pivoting pin member 31 provides for alternately blocking or unblocking the exhaust gas flow to the downstream end portion of manifold section 28 and through the opposing downstream end portion of catalyst section 27.

Manual adjustment of the damper plate 30 may be provided to effect the blocking or unblocking of the gas stream flow to in turn eliminate or bring into operation a portion of the catalyst bed. However, here again, a preferred form of the apparatus provides means for automatically moving the damper plate 30 responsive to a variation from a predetermined temperature level in the upstream portion of the catalyst bed. Temperature sensitive means 32, such as a thermocouple, is connective through line 33 with a switching means or power amplification means 34, which in turn connects with a power source at 38 and with a solenoid 35. The latter moves the connecting rod 36 and arm 37 on pin 31 to effect the desired partial rotation of damper 30. The temperature sensitive means 32 and the solenoid linkage arrangement may be adjusted such that at a low predetermined temperature level the damper plate 30 will be in a raised open position permitting gas flow across and through the entire catalyst retaining section, while with a higher temperature above the preset level there will be an activation of the solenoid to move the damper arm 37 into a position that will rotate the plate 30 approximately 90° and into a transverse position which will block gas flow from entering the downstream end of manifold 38 and the end portion of the catalyst section 27.

It may be noted that still other apparatus embodiment as well as automatic temperature sensing and motor means may be provided to carry out the present invention to preclude the continuous exhaust gas flow through all parts of the catalyst bed at all temperature ranges. It is preferred, however, that the gas flow in the various apparatus arrangements shall be channeled in a direction which substantially parallels the longitudinal positioning of the catalyst treating section such that the downstream end portion of the inlet manifold and the opposing downstream end portion of the catalyst bed may be readily blocked and result in the entire stream flow passing through an upstream portion of the bed for high temperature conditions. By this type of an arrangement, there is maintained a downstream end section which can retain its low temperature ignition characteristics for a long period of time and in general will be in operation only a small fractional portion of the total usage of the converter, whereby there is a minimum of lead or other contaminating deposition in such ignition section. As previously pointed out, converter arrangements which cause impingement of the exhaust gas stream directly perpendicularly against the catalyst bed tend to use a minimum of the peripheral portions of the beds; however, such peripheral areas will not generally act as ignition zones and there will be a resulting inefficient high temperature ignition performance to the entire bed after a period of time. This will be particularly true by reason of the central section or gas impingement area being continuously in use under resulting high gas flow and high temperature conditions, as well as subjected to lead deposition from leaded fuels. In the preferred designs which have been set forth in the accompanying drawing, it will be noted that the incoming exhaust gas stream flows substantially parallel with or at a slight acute angle with respect to the catalyst section such that there may be a substantially uniform gas distribution from the manifold section through the bed to the opposing collection manifold section and at the same time there may be means for blocking and unblocking an advantageously positioned ignition system.

It is also within the scope of the present invention to provide for the placement of one or more resonating chambers interiorly within the converter-muffler housing, or in direct association therewith at one or more ends of the unit, in order to provide for additional noise suppression or to maintain hot gas insulating like sections in combination with the catalyst oxidizing section in the unit. It is also to be understood that various minor modifications may be made with respect to the construction and design of the apparatus embodiment, as, for example, with the provision for internal expansion of the catalyst retaining members, or with respect to the type and position of the damper means associated with the gasoline manifold or alternatively with respect to the automatic motor means for adjusting the damper. Specifically, a slot 39 in the wall of the outer perforate member 7 at the zone of the rotatable shaft member 20 will preclude the bending of the latter as the outer catalyst retaining member 7 expands and retracts longitudinally under temperature changes. The location of the shaft member 20 and direction of rotation of damper plate 12 may be altered where it is desired to place the motor means and linkage on the side of an elliptical converter. In other words, with respect to the embodiment of FIGURES 1 and 2, the pin 20 would enter the housing 1 from the side thereof and the damper plate 12 would rotate through 90° from a horizontally positioned shaft or pin member 20. The flow directions may be reversed through the units, although their operation efficiency may not be as high. Further, the terminology "cylindrical," "cylindrical-form" and "annular-form," as used herein, embodies both circular and oval cross sections with respect to a tubular member or a zone between spaced tubular members, inasmuch as the present improved form of construction may apply to either the circular or oval form of housing and interior chambers. The exterior appearance of the improved converter-muffler will thus be similar to that of the present day cylindrical or oval-shaped mufflers and resonators in use with automobiles and trucks. Oval shapes are preferred for present day passenger automobiles in order to reduce the height of the converter and more readily permit installation on the vehicle without unduly interfering with necessary road clearances.

The perforations in the catalyst retaining members will, of course, be sized in relation to the size of the catalyst particles which are to be maintained within the apparatus. The physical shape of the catalyst particles may be such that they are in the form of spheres, cylinders or pellets, typically having a dimension of $\frac{1}{16}$-inch to about $\frac{1}{4}$-inch, although particles of larger or smaller dimensions may be employed, where desirable. Mixed sizes of catalyst may well be utilized. However, in loading the catalyst, care should be taken to be sure that the catalyst particles are uniformly packed in all portions of the bed to provide substantially uniform resistance to the gas flow therethrough. As indicated hereinbefore, it is not intended to limit the present invention to any one type of catalyst, but suitable oxidation catalysts include the metals of Groups I, V, VI and VII of the Periodic Table, particularly copper, silver, vanadium, chromium, iron, cobalt, nickel and platinum. These components may be used singly, in combination with two or more, or may be composited with an inorganic refractory oxide such as alumina, silica-alumina, silica-alumina-zirconia, silica-thoria, silica-boria and the like.

We claim as our invention:

1. A catalytic converter-muffler for treating an exhaust gas stream which comprises in combination, an elongated outer housing having an inlet port at one end and an outlet port at the other end thereof, an elongated perforate catalyst retaining section extending for at least a major portion of the interior length of said housing, subdivided catalyst particles maintained within said catalyst retaining section and forming a catalyst bed, an inlet manifold means from the inlet port at one end of said housing that is coextensive with one face of said perforate catalyst retaining section and suitable for distributing a gas stream therethrough, an opposing gas collection manifold coextensive with the opposing face of said catalyst retaining section and connective with the outlet port of said housing, whereby an exhaust gas stream may be passed through said housing and through the catalyst maintained therein, and movable damper means positioned within said housing and the inlet manifold serving to partition the bed into an upstream and downstream section, with said damper means adjustable to preclude gas flow when closed only through the downstream end section of said inlet manifold and through said catalyst retaining section opposing such downstream end thereof.

2. A catalytic converter-muffler for treating an exhaust gas stream which comprises in combination, an elongated outer cylindrical-form housing having a gas port at each end thereof, an inner perforate tubular-form gas conducting member extending from one of said gas ports for a major portion of the interior length of said housing to a non-perforate end closure plate spaced from the opposing gas port, an outer perforate tubular-form particle retaining member positioned around said inner perforate member and coextensive therewith from the end of said housing to said end closure plate, said outer perforate member being spaced from said inner member and from the inside wall of said housing and forming thereby a confined annular-form particle retaining section between the perforate members and an open-ended elongated annular-form gas manifold section which surrounds said particle retaining section and is in open communication with the space between said end closure plate and said opposing port, subdivided exhaust gas treating particles within said particle retaining section, a movable damper member mounted within the interior of said inner perforate tubular member at a spaced distance from said end closure plate and adjustably movable to block and unblock gas flow longitudinally through a portion of said inner perforate member, temperature sensitive means in said bed connective with motor means, said motor means in turn connecting with said movable damper member, whereby the latter may be moved to alternatively obstruct and permit exhaust gas flow through a downstream end of said inner tubular member responsive to a variation in temperature from a predetermined level as measured by said temperature sensitive means.

3. The apparatus of claim 2 further characterized in that said damper member is pivotally positioned within said inner perforate tubular member by connection with a rotatable pin member extending to the exterior of said housing, said motor means connects through linkage arms with said pin member to rotate the latter 90° between an open position and a closed transverse position across said inner perforate member.

4. The apparatus of claim 2 further characterized in that said temperature sensitive means in the particle retaining section is positioned at the upstream end thereof between the gas inlet port and said damper member.

References Cited by the Examiner

UNITED STATES PATENTS

| | | |
|---|---|---|
| 2,071,119 | 2/1937 | Harger. |
| 2,807,930 | 10/1957 | Bratton. |
| 2,898,202 | 8/1959 | Houdry et al. |
| 3,050,375 | 8/1962 | Bloch. |
| 3,067,002 | 12/1962 | I. Reid _____ 23—2 |
| 3,086,839 | 4/1963 | Bloch _____ 22—2 |
| 3,094,394 | 6/1963 | Innes et al. _____ 23—288 |
| 3,097,074 | 7/1963 | Jonnson _____ 23—288 |
| 3,149,926 | 9/1964 | Johnson. |

FOREIGN PATENTS

| | | |
|---|---|---|
| 1,088,764 | 9/1960 | Germany. |
| 411,377 | 6/1934 | Great Britain. |

MORRIS O. WOLK, *Primary Examiner.*

MICHAEL A. BRINDISI, *Examiner.*